Dec. 25, 1962   E. A. MEYER   3,069,963
SHEET METAL FASTENER FOR ENGAGEMENT WITH FLAT OR ROUND STUD
Original Filed Nov. 3, 1953
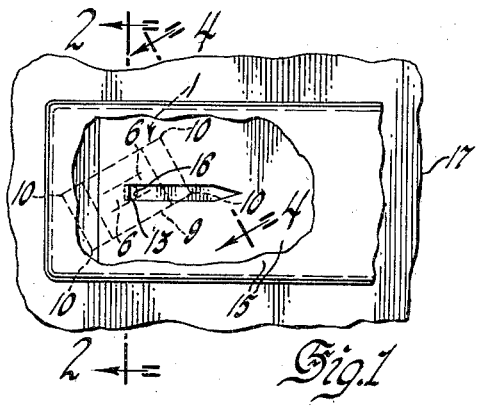
Fig.1
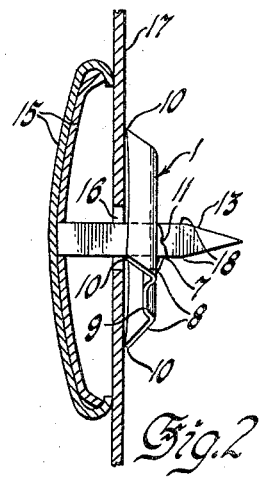
Fig.2
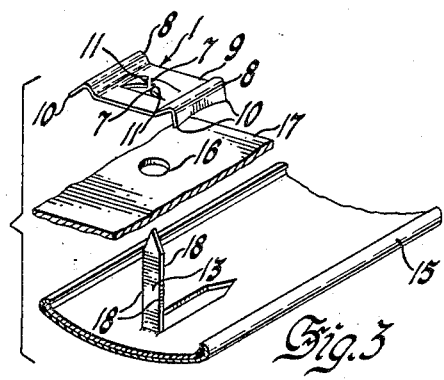
Fig.3
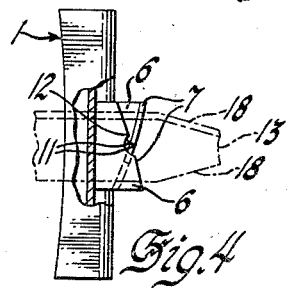
Fig.4
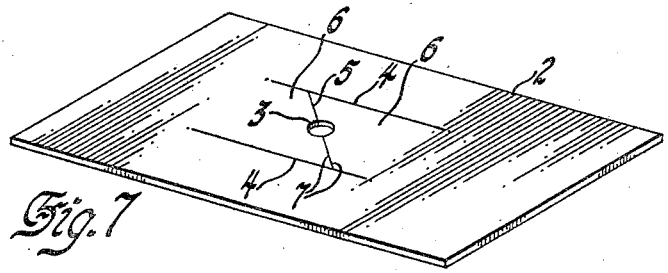
Fig.7
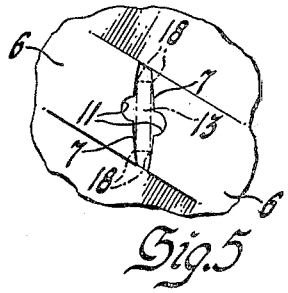
Fig.5
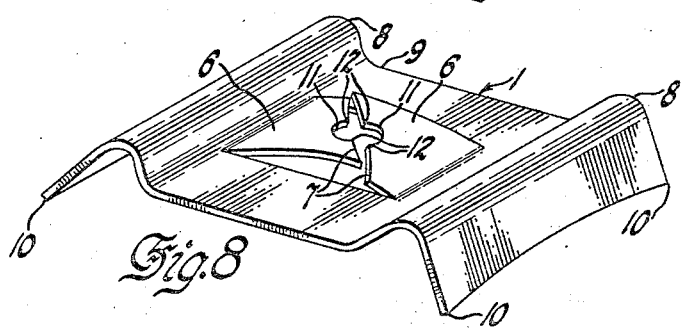
Fig.8
Fig.6
INVENTOR
Engelbert A. Meyer
BY
ATTORNEY

United States Patent Office 3,069,963
Patented Dec. 25, 1962

3,069,963
SHEET METAL FASTENER FOR ENGAGEMENT WITH FLAT OR ROUND STUD
Engelbert A. Meyer, Pontiac, Mich., assignor to General Motors Corporation, Detroit, Mich., a corporation of Delaware
Continuation of abandoned application Ser. No. 389,967, Nov. 3, 1953. This application Jan. 31, 1961, Ser. No. 86,203
1 Claim. (Cl. 85—36)

This invention relates to fasteners generally, and more particularly to fasteners formed from spring metal and provided with oppositely disposed tongues for engaging a stud therebetween.

This is a continuation of copending application Serial No. 389,967, now abandonded, filed November 3, 1953, in the United States Patent Office.

In securing moldings or other ornamental objects provided with spaced studs to supporting panels or the like having apertures formed therein to receive the studs, it is common to employ an easily applied spring metal fastener having oppositely disposed tongues adapted to engage a stud therebetween. The studs are inserted through the apertures until the molding is flush against the outside of the panel and then a fastener is pushed onto each stud and against the inside of the panel so that the tongues engage the stud and prevent its subsequent removal from the aperture.

There are numerous ways of forming the studs and attaching them to the moldings. For example, round studs may be welded to the molding and flat studs may be punched out of a liner associated with the molding. Furthermore, both types of studs may vary in size. This variance in the shapes and sizes of the studs creates serious fastener problems for the user of moldings. Either a special fastener must be used for each size and shape of stud encountered, in which case the benefits of volume purchases are lost and the assembly processes become more complicated, or the quality of workmanship may be jeopardized by using a fastener designed for a particular stud with studs of various other shapes and sizes, in which case the engagement of the stud by the fastener is only superficial.

It is now proposed to provide a multipurpose fastener of the type and for the purpose described above having tongues adapted to engage equally well both flat and round studs within the normal range of sizes. It is also proposed to provide a fastener such as that described which, due to the structure of the tongues, will engage studs more securely than do fasteners presently employed.

In the drawings:

FIGURE 1 is a plan view partly cut away of a fastener installation embodying the invention in which the fastener engages a flat stud;

FIGURE 2 is a cross-sectional view partly in elevation taken along the plane of line 2—2 of FIGURE 1;

FIGURE 3 is an exploded perspective view of the installation shown in FIGURE 1;

FIGURE 4 is an end elevational view, partly broken away, taken in the direction of the arrows along the line 4—4 of FIGURE 1 and showing in more detail the manner in which a flat stud is engaged by the fastener;

FIGURE 5 is a fragmentary plan view showing in more detail the manner in which a flat stud is engaged by a fastener embodying the invention;

FIGURE 6 is a fragmentary plan view showing the manner in which a round stud is engaged by a fastener embodying the invention;

FIGURE 7 is a developed view of a spring metal plate which has been apertured and slit according to the preferred embodiment of the invention; and FIGURE 8 is a perspective view of a preferred form of fastener embodying the invention.

Referring to the drawings in more detail, a fastener of preferred form and generally designated 1 may be constructed from a spring metal plate 2. A circular aperture 3 may be formed near the center of the plate 2 and parallel slits 4 may be formed in the plate 2 on opposite sides of the aperture 3. Another slit 5 may be formed across the center of the aperture 3 to obliquely join the first parallel slits 4 and to form in the plate a pair of oppositely disposed tongues 6 with diagonally disposed free ends 7 and edges of unequal length. The ends 8 of the plate beyond the portions of the tongues attached to the plate may be arched to provide a middle bridge portion 9 in the fastener 1, with the arched ends 8 comprising flexible supports therefor. The arched ends may be provided with points 10, as by arching the ends 8 across the width thereof, for better engagement with a flat surface against which the fastener 1 may be made to bear. The tongues 6 may be formed out of the plane of the middle bridge portion 9 and they may be also formed so as to be longitudinally and transversely arched. Furthermore, the free ends 7 of the tongues 6 are transversely sloped in opposite directions so that the orthographic projections of the end surfaces of the tongues 6 on a plane passing between such end surfaces and perpendicular to the middle bridge portion cross substantially medially of each other.

It will be observed, moreover, that the free ends 7 of the tongues 6 are more widely spaced near their centers than they are at their outer edges, as shown in FIGURE 5. This may be done in any manner, although in the preferred form of fastener shown it is accomplished by forming the diagonally disposed free ends 7 of the tongues 6 so that they are transversely curved and sloped. Since the spring metal plate 2 is slit across the aperture 3 and the tongues 6 are formed out of the plane and the plate, the free ends 7 of the tongues 6 are thus provided with semicircular notches 11. Thus corners 12 are provided on the free ends 7 where the notches 11 are formed therefrom.

A fastener constructed in the above manner may be used to secure a molding 15 having flat studs 13 or round studs 14 projecting therefrom to the outside of a supporting panel 17 having apertures 16 to receive the studs. In assembly, the studs 13 or 14 on the molding 15 are inserted through the apertures 16 so that the molding 15 is flush with the outside of the panel 17 and a fastener 1 is placed over the free end of each stud 13 or 14 so that the stud is engaged between the free ends 7 of the tongues 6. While the molding 15 is held tightly against the outside of the panel 17, the fastener 1 is pushed along the stud 13 or 14 toward the inside of the panel 17 until the points 10 engage the panel and until the bridge portion 9 is sprung toward the panel 17. In this manner the spring action of the tongues 6 and of the bridge portion 9 applies an axial force on the stud 13 or 14 to prevent its being removed from the aperture 16 and to keep the molding 15 tight against the outside of the panel 17.

It will be observed that since the free ends 7 of the tongues 6 are more widely spaced near their centers, due to the transverse curvature of the tongue ends, a flat stud 13 is engaged at the corner edges 18 thereof. It will also be observed, since the free ends 7 of the tongues 6 are transversely sloped in opposite directions, and since the edges of each tongue are of unequal length, that a flat stud 13 will tend to be longitudinally twisted in the region of engagement of the flat stud 13 by the free ends 7 of the tongues 6. Furthermore, since the free ends 7 of the tongues are diagonally disposed, a shearing action takes place at the points of engagement of the stud 13 by the free ends 7 of the tongues 6. The resistance of the flat stud 13 to the above twisting and shearing actions results in a deeper bite of the tongue ends 7 into the stud 13 and a more positive prevention of its removal from the aperture 16 than in the case of fasteners heretofore employed.

A consideration of the forces exerted on the stud by the tongues 6 will better illustrate the manner in which the flat stud 13 is longitudinally twisted and the manner in which the shearing action is supplied at the points of engagement of the stud. It has been noted that the edges of each tongue are of unequal length and that the tongue ends are transversely sloped. Thus, the corner of the shorter edge is lower, or closer, to the spring metal plate 2 than is the corner of the longer edge of the tongue. This means that the shorter edge has the effect of a short leaf spring when compared with the longer edge of the tongue. Since the two tongue ends are diagonally disposed and the intersection of the orthographic projections of the tongue ends on a plane passing therebetween and perpendicular to the spring metal plate 2 is midway between the edges of the tongues, the corners defined by the tongue ends and the shorter edges will be substantially the same distance from the plate 2 and the corners defined by the tongue ends and the longer edges will also be displaced the same distance from the plate 2. A flat stud disposed between the tongue ends will have forces exerted thereon by the tongues at the points of engagement with the stud 13. A greater force will be exerted by the lower corners, since these have the effect of stronger springs, than will be the forces exerted by the upper or higher corners of the tongues. The forces exerted by the opposing lower corners will result in a force couple in a direction tending to rotate the stud 13. The forces exerted by the upper corners will result in a force couple in the opposite direction, but of less magnitude than the couple exerted by the lower corners, thus resulting in an unbalanced couple in one direction tending to longitudinally twist the stud 13.

At the same time, considering the couples exerted by these same forces along an axis passing through the point of intersection of the tongue ends, it will be seen that couples in the same direction will be exerted by the combined forces of the upper and lower corners at each side of the tongues. This is so because the respective corners are spaced from the reference axis the same distance and the respective forces are of the same magnitude. These unopposed force couples provide a shearing action on the stud 13 to more securely fix the fastening device on the stud.

The free ends 7 of the tongues 6 may be provided with semicircular notches 11 near their centers. It can be seen that the present fastener may also be used to secure a molding 15 provided with round studs 14. When the tongue ends 7 are spread apart by the forming of the tongues 6 out of the plane of the spring metal plate 2 or by the insertion of a round stud 14, the semicircular notches 11 are also spread so that they no longer lie in the circle from which they were originally formed. The displacement of the semicircular notches is a result of the configuration of the tongues 6, where the tongue ends are diagonally disposed with respect to the line of the bend where the tongues 6 are formed or bent out of the plane of the spring metal blade 2. In other words, the displacement of the notches is caused by the difference in deflection of the edges of the tongues, the edges being of unequal lengths. Therefore, as the round stud 14 is forced between the tongue ends 7 the stud 14 centers itself between both of the corners 12 formed by the notch 11 on one tongue end 7 and only one of the corners 12 on the other tongue end 7. This is true because the transverse curvature and slope of the diagonally disposed tongue ends 7 tend to transversely offset the notches 11. Where the tongue ends 7 are not diagonally disposed the stud 14 will be engaged by two corners 12 on each tongue end. The notches 11 need not necessarily be semicircular end but they can be of any shape which will provide corners for engaging the studs. Also, the notches 11 need not be located exactly at the centers of the tongue ends 7. The same spring actions and the same shearing action, as above described with respect to a flat stud 13, also occur in the case of a round stud 14 so that a round stud is also more positively engaged and retained in the aperture 16 than it would be with the use of present fasteners.

From the foregoing description and drawings, it can be seen that there has been provided a multipurpose fastener adapted for use with both flat studs and round studs within a practical range of stud dimensions and which more positively engages such studs than to fasteners presently employed.

What is claimed is:

A stud receiving fastener device for securing an object having a stud to a support having an aperture comprising a spring metal plate having arched ends connected by a flat middle portion and pair of tongues formed from said flat middle portion with the free ends of said tongues diagonally extending relative to the longitudinal axes thereof and positioned in adjacent and oppositely disposed relation, said free ends being transversely sloped in opposite relation and with the projections of the end surfaces of said free ends on a plane passing between said free ends and perpendicular to said plate intersecting substantially midway between the ends thereof, said free ends each being concaved and adapted to engage a flat stud at the corners thereof and said free ends each being provided with a semicircular notch near the center thereof to adapt said free ends to receive a round stud as well as a flat stud, said semicircular notches being laterally offset such that a round stud will be engaged by only three of the corners provided where said notches are formed out of said free ends.

References Cited in the file of this patent

UNITED STATES PATENTS

| | | |
|---|---|---|
| 2,007,011 | Tinnerman | July 2, 1935 |
| 2,373,312 | Hughes | Apr. 10, 1945 |